United States Patent [19]
Lang et al.

[11] Patent Number: 5,496,591
[45] Date of Patent: Mar. 5, 1996

[54] RADIATION-CURABLE BINDERS

[75] Inventors: Reinhard Lang, Neustadt; Erich Beck, Harthausen; Edmund Keil, Ludwigshafen; Adolf Nuber, Boehl-Iggelheim; Harro Petersen, Frankenthal; Hans Renz, Meckenheim, all of Germany; Horst Schmidt, Oosterbeek, Netherlands; Wolfram Weiss, Mutterstadt, Germany

[73] Assignee: BASF Aktiengesellschaft, Ludwigshafen, Germany

[21] Appl. No.: 239,860

[22] Filed: May 9, 1994

Related U.S. Application Data

[63] Continuation of Ser. No. 905,187, Jun. 26, 1992, abandoned, which is a continuation of Ser. No. 720,137, Jun. 24, 1991, abandoned.

[30] Foreign Application Priority Data

Jun. 29, 1990 [DE] Germany .......................... 40 20 766.8

[51] Int. Cl.$^6$ ..................................................... C08J 7/04
[52] U.S. Cl. ........................... 427/520; 522/167; 525/518
[58] Field of Search .......................... 427/520; 522/167; 525/518

[56] References Cited

U.S. PATENT DOCUMENTS

| | | | |
|---|---|---|---|
| 3,020,255 | 2/1962 | Magrane | 525/518 |
| 3,539,661 | 11/1970 | Puntigam | 526/194 |
| 4,751,112 | 6/1988 | Smith, Jr. et al. | 427/388.3 |

FOREIGN PATENT DOCUMENTS

| | | |
|---|---|---|
| 2550740 | 5/1977 | Germany . |
| 1562243 | 3/1980 | United Kingdom . |

*Primary Examiner*—Mark A. Chapman
*Attorney, Agent, or Firm*—Keil & Weinkauf

[57] ABSTRACT

Radiation-curable binders which are obtained by reacting

A) an amine/formaldehyde condensate having a molar ratio of formaldehyde to amino groups of from 1:1 to 2:1 with B) one or more esters, having a free hydroxyl group, of acrylic acid or of methacrylic acid with polyalcohols which contain from two to four alcoholic hydroxyl groups, from 0.1 to 0.3 hydroxyl equivalent of component B) being used per methylol equivalent of component A), in the presence of a strong acid are suitable for use in coating materials.

3 Claims, No Drawings

RADIATION-CURABLE BINDERS

This application is a continuation of application Ser. No. 07/905,187, filed on Jun. 26, 1992, now abandoned, which is a continuation of application Ser. No. 07/720,137, filed on Jun. 24, 1991, now abandoned.

The present invention relates to radiation-curable binders obtainable by reacting A) an amine/formaldehyde condensate having a molar ratio of formaldehyde to amino groups of from 1:1 to 2:1 with B) one or more esters, having a free hydroxyl group, of acrylic acid or of methacrylic acid with polyalcohols which contain from two to four alcoholic hydroxyl groups, from 0.1 to 0.3 hydroxyl equivalent of component B) being used per methylol equivalent of component A), in the presence of an acid having a pK of <3.0 as a catalyst, with removal of volatile reaction products by distillation under reduced pressure.

It is generally known that binders which carry monoolefinically unsaturated groups, for example acrylate groups, can be cured by high energy radiation.

Such binders can be used in the preparation of coating materials.

Radiation curing is frequently used only for rapid initial curing to prevent the coated articles from sticking to one another, which is particularly important in the mass production of coated articles.

DE-A 25 50 740 discloses radiation-curable coating materials which contain (meth)acryloyl-carrying aminoplast resins as binders. However, these coating materials contain relatively large amounts of free (meth)acrylate monomers, which, during processing, leads to problems with regard to environmental pollution on the one hand and the performance characteristics on the other hand; coating materials containing more than 1% by weight of residual monomers must in fact be marked as such.

It is an object of the present invention to provide radiation-curable binders for coating materials, which binders have a low content of free (meth)acrylate and give coatings having good performance characteristics.

We have found that this object is achieved by the radiation-curable binders defined at the outset, which are obtainable by reacting an amine/formaldehyde condensate with an ester, having free hydroxyl groups, of (meth)acrylic acid.

Condensates of formaldehyde and aminoplast formers are reacted as components A), amino-containing compounds, for example urea, melamine, benzoguanamine, acetoguanamine, acetylenediurea, ethyleneurea or propyleneurea, being suitable aminoplast formers; from one to two equivalents of formaldehyde are used per amino equivalent. The condensates can be prepared in weakly alkaline media by the process known to the skilled worker, products having a low or high degree of condensation being formed, depending on the reaction conditions. Hexamethylolmelamine is preferably used.

In a preferred embodiment, the condensates A) may be present in a form partially or completely etherified with $C_1$–$C_6$-monoalcohols. The etherification can be carried out by known processes in an acidic medium. Preferably used alcohols are methanol as well as isobutanol, butanol and mixtures of methanol with isobutanol or butanol. Hexamethoxymethylmelamine is preferably used as etherified component A).

Suitable components B) are esters, having free hydroxyl groups, of acrylic acid or of methacrylic acid with polyalcohols which contain from two to four alcoholic hydroxyl groups. Such polyalcohols may be polymeric, hydroxyl-substituted compounds, such as polyesterols or polyetherdiols, or, preferably, saturated $C_2$–$C_{15}$-diols, -triols or -tetraols, eg. ethanediol, propanediol, butanediol, pentanediol, hexanediol, glycerol or pentaerythritol. Components B) are then, for example, hydroxyethyl acrylate, hydroxypropyl acrylate, hydroxyhexyl acrylate, glyceryl diacrylate and pentaerythrityl triacrylate. Butanediol monoacrylate is particularly preferred.

The amount of B) is such that from 0.1 to 0.3 hydroxyl equivalent of component B) is used per methylol equivalent of component A).

In addition, from 0.02 to 0.4% by weight, based on the amount of component B), of a polymerization inhibitor C) is added, making it possible to prevent homopolymerization of component B). Examples of suitable initiators are hydroquinone, hydroquinone monoalkyl ethers, 2,5-di-tert-butyl-4-methylphenol or phenothiazine.

A) is reacted with B) in the presence of the catalytic amount of an organic or inorganic acid having a pH of <3.0. Examples of suitable acids are hydrochloric acid, sulfuric acid, oxalic acid, maleic acid, phthalic acid and para-toluenesulfonic acid. From 1 to 30 meq of acid are usually used per methylol equivalent of component A).

The reaction can be carried out at from 50° to 150° C., preferably from 60° to 120° C.

By working under a reduced pressure of from 0.01 to 0.25, preferably from 0.05 to 0.15, bar, volatile constituents of the reaction mixture can be distilled off during the reaction.

The reaction can be terminated by neutralizing the acid with a base, such as aqueous sodium hydroxide solution, an alkylamine, eg. triethylamine or tributylamine or an alkanolamine, such as dibutylethanolamine, diethanolamine or triethanolamine, the end point being chosen so that the neutralization is effected when not less than 90% by weight of theoretically formed methanol have been distilled off.

After the end of the reaction, further distillation at about 50–100 mbar may be carried out in order very substantially to remove residual amounts of volatile components.

The novel binders are obtained as clear, colorless to slightly yellow highly viscous resins having a viscosity of about 5–10 Pa.s (23° C.) and containing, as a rule, less than 1% by weight of a free component B.

The novel resins are very useful as binders for radiation-curable coating materials, the resins being used in amounts of from 10 to 100% by weight, based on the total resin material. Low-viscosity resins are themselves suitable coating materials. Resins having a relatively high viscosity can be diluted with liquid copolymerizable organic compounds (reactive diluents), from 0 to 60% by weight, based on the coating material, of reactive diluent usually being used. Examples of suitable reactive diluents are butanediol diacrylate, hexanediol diacrylate, trimethylolpropane diacrylate, trimethylolpropane triacrylate and tripropylene glycol diacrylate.

In addition to the novel resins, the coating materials may furthermore contain from 0 to 90% by weight of other photopolymerizable binders, for example polyester acrylates, polyether acrylates, polyurethane acrylates or acrylate-modified epoxy resins.

In addition, the coating materials may contain up to 30% by weight of solvents as conventionally used for coating applications, for example aromatics, esters, ketones, alcohols or mixtures of such solvents.

However, the solvents must be very substantially removed before radiation curing. Furthermore, conventional coating binders, such as polyester resins, alkyd resins, polyacrylate resins and crosslinking agents for coatings, eg. amino resins, isocyanates or epoxy resins, can be added in amounts of up to 30% by weight.

The coating materials may furthermore contain from 0 to 80% by weight of pigments, such as those which are suitable fox coating applications.

Conventional assistants, such as thixotropic agents, leveling agents, flatting agents, deaerating agents or lubricants, in amounts of up to 10% by weight, may also be used.

Curing can be effected either with the aid of electron beams having an energy of from 100 to 400 kV and used in a dose of from 0.5 to 10 Mrad or by UV light having a wavelength of from 220 to 450 nm and used in a dose of from 20 to 1,000 mJ/cm$^3$. During curing with UV light, photoinitiators, such as benzil dimethyl ketal, benzophenone or acylphosphine oxides are advantageously added to the coating materials, if necessary together with coinitiators, eg. dimethylethanolamine, in amounts of from 0.5 to 10% by weight.

In addition to radiation curing, curing may be effected by drying or baking at from 30 to 200° C. or by acid catalysis, compounds such as p-toluenesulfonic acid, maleic acid or phosphoric acid being added in amounts of from 0.2 to 10% by weight, as acidic catalysts.

Such additional curing is advisable in particular for highly pigmented coating materials and also in the coating of moldings having a demanding structure, for example chairs or other requisites, where there is no guarantee that the radiation will cover the total surface to be cured.

The novel coating materials are suitable for coating wood, metal, paper or plastic.

The coatings have good resistance to mechanical stresses.

EXAMPLE 1

A mixture of 390 g (1 mol) of hexamethoxymethylmelamine, 163 g (1.13 mol) of butanediol monoacrylate, 0.2 g (0.9 mol) of 2,5-di-tert-butyl-4-methylphenol and 2 g (11 mmol) of p-toluenesulfonic acid was heated to 90° C. Thereafter, about 45 g of readily volatile constituents were distilled off into a cold trap in the course of 30 minutes at 80° C. and from 0.11 to 0.14 bar. The reaction mixture was neutralized with tributylamine and then subjected to further distillation at 110° C. and from 0.07 to 0.1 bar, a further 5 g of volatile constituents being distilled off. 510 g of a resin having a viscosity of about 5 Pa.s (23° C.) were obtained from the distillation residue by filtration.

The content of free butanediol monoacrylate, determined by gas chromatography, was less than 0.5% by weight.

EXAMPLE 2 (for comparison)

Preparation of a binder according to Example 1 of German Laid-Open Application DOS 2,550,740

A mixture of 390 g (1 mol) of hexamethoxymethylmelamine, 432 g (3.0 mol) of butanediol monoacrylate, 0.5 g (0.46 mol) of hydroquinone, 4.7 g of concentrated hydrochloric acid and 240 g of cyclohexane was heated to the boil, an azeotropic mixture of water and methanol being removed via a water separator. After about 90 minutes, separation of methanol was complete. Cyclohexane was then removed by distillation under reduced pressure at 90° C.

The content of free butanediol monoacrylate, determined by gas chromatography, was 11% by weight.

Processing Examples

EXAMPLE A 100 g of the resin obtained according to Example 1 were provided with 4 g of benzil dimethyl ketal and diluted with 12 g of butyl acetate so that the viscosity of the mixture was 0.5 Pa.s (23° C.). The coating thus obtained was applied by means of a knife coater in a wet film thickness of 25 μm to a zinc-phosphatized steel sheet, dried in the air for two minutes and then cured by passing it under a high pressure mercury tube having a power of 80 watt/cm at a belt speed of 5 m/min. The glossy film, which has fingernail hardness after exposure, was then baked for 20 minutes at 170° C.

The performance characteristics are listed in the Table.

EXAMPLE B (for comparison)

4 g of benzil dimethyl ketal were added to 100 g of the resin obtained according to Example 2, and the mixture was diluted with 3 g of butyl acetate. The coating material thus obtained was processed similarly to Example A.

The performance characteristics are shown in the Table below.

| Example | Pendulum damping according to DIN 53,157 [sec] | |
|---|---|---|
| | A | B |
| After exposure | 35 | 73 |
| After baking | 195 | 153 |

We claim:
1. A process for coating an article which comprises
   (A) coating the article with a binder composition which consists of
      (1) from 10 to 100% by weight of a binder, said binder being a compound which is the reaction product of 1 mole hexamethoxymethylmelamine and 0.6 to 1.8 moles of 4-hydroxybutyl (meth)acrylate;
      (2) from 0 to 90% by weight of a second binder compound selected from the group consisting of polyester acrylates, polyether acrylates, polyurethane acrylates, and acrylate-modified epoxy resins;
      (3) from 0 to 30% by weight of a solvent
      (4) from 0 to 80% by weight of pigments;
      (5) from 0 to 10% by weight of assistants; and
   (B) exposing the coated article to radiation.
2. The process of claim 1, further comprising step (C) in which the radiated article is subjected to baking or drying at from 30° to 200° C. or to acid catalysis.
3. A process for coating an article which comprises
   (A) coating the article with a binder composition which consists of
      (1) from 10 to 100% by weight of a binder, said binder being a compound which is the reaction product of 1 mole hexamethoxymethylmelamine and 0.6 to 1.8 moles of 4-hydroxybutyl (meth)acrylate;
      (2) from 0 to 90% by weight of a second binder compound selected from the group consisting of polyester acrylates, polyether acrylates, polyurethane acrylates, and acrylate-modified epoxy resins;
      (3) from 0 to 30% by weight of a solvent;
      (4) from 0 to 80% by weight of pigments;
      (5) from 0 to 10% by weight of assistants;
      (6) from 0 to 60% by weight of reactive diluents; and
   (B) exposing the coated article to radiation.

* * * * *